(12) United States Patent
Yonemaru

(10) Patent No.: US 7,216,407 B2
(45) Date of Patent: May 15, 2007

(54) APPARATUS AND METHOD FOR PROCESSING SCREW ROTOR AND CUTTING BIT

(75) Inventor: Kiyoharu Yonemaru, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 98 days.

(21) Appl. No.: 10/521,178

(22) PCT Filed: Mar. 29, 2004

(86) PCT No.: PCT/JP2004/004418
§ 371 (c)(1),
(2), (4) Date: Jan. 14, 2005

(87) PCT Pub. No.: WO2004/089569

PCT Pub. Date: Oct. 21, 2004

(65) Prior Publication Data

US 2006/0048360 A1    Mar. 9, 2006

(30) Foreign Application Priority Data

Apr. 9, 2003    (JP)    ............... 2003-104912

(51) Int. Cl.
*B23C 3/00*    (2006.01)
*B23P 15/00*    (2006.01)
(52) U.S. Cl. ............... 29/27 C; 29/888.02; 29/888.023; 409/132; 409/133; 409/141
(58) Field of Classification Search ............ 29/889.23, 29/558, 893.35, 888.02, 888.022, 888.023, 29/889.7, 559; 451/47, 48, 253; 409/131, 409/132; 416/236 R; 418/201.1
See application file for complete search history.

(56) References Cited

U.S. PATENT DOCUMENTS

| | | | | |
|---|---|---|---|---|
| 4,109,362 A | * | 8/1978 | Ingalls | ............ 29/888.023 |
| 5,964,016 A | * | 10/1999 | Ito et al. | ............ 29/27 C |
| 6,077,002 A | * | 6/2000 | Lowe | ............ 29/889.2 |
| 6,122,824 A | * | 9/2000 | Jensen | ............ 29/888.023 |
| 6,604,015 B2 | * | 8/2003 | Iriguchi et al. | ............ 700/187 |
| 7,040,845 B2 | * | 5/2006 | Matsumoto et al. | ............ 409/132 |

FOREIGN PATENT DOCUMENTS

| | | |
|---|---|---|
| JP | 49-89986 | 8/1974 |
| JP | 5-50345 | 3/1993 |
| JP | 6-254720 | 9/1994 |
| WO | 92/18278 | 10/1992 |

* cited by examiner

*Primary Examiner*—Dana Ross
(74) *Attorney, Agent, or Firm*—Sughrue Mion, PLLC

(57) ABSTRACT

A method for processing a screw rotor includes a step of rotating a blade holder 2 while shifting the blade holder 2 in X-axis, Y-axis, and Z-axis directions to form a groove on the outer surface of a rotating cylindrical workpiece 1 with a tool 3 using a processing apparatus having a bed 11; a C-axis shaft supporter 12 disposed on the bed 11; a C-axis shaft 14 held by the C-axis shaft supporter 12, the C-axis shaft 14 for rotating the cylindrical object 1; a column 13 disposed on the bed 11; the blade holder 2 rotatably held by the column 13; and the tool 3 attached to the blade holder 2.

7 Claims, 15 Drawing Sheets

ARROW A →

VIEW ALONG ARROW A

FIG. 21 (A)
FIG. 21 (B)
VIEW ALONG ARROW A
FIG. 21 (C)
ENLARGED VIEW OF BLADE EDGE
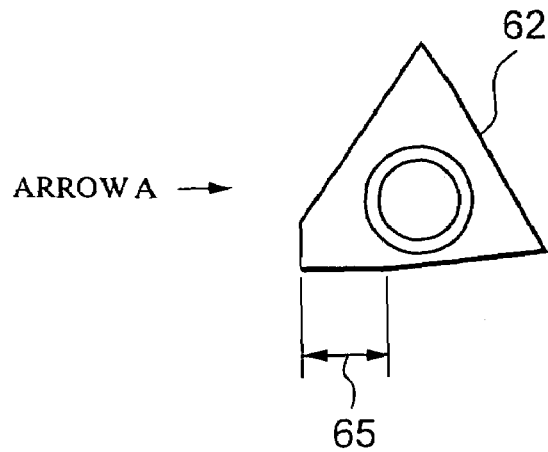
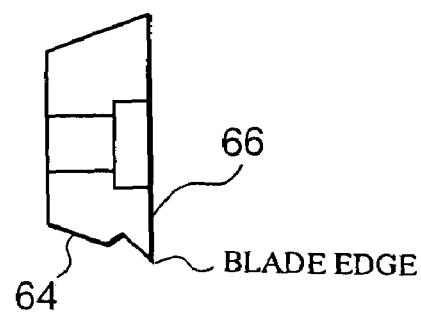
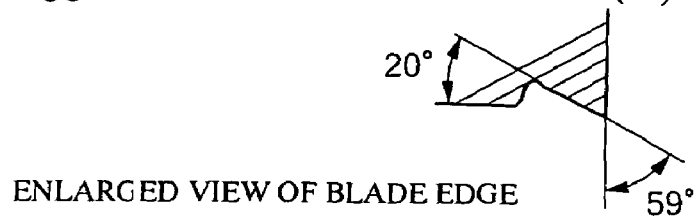
FIG. 22
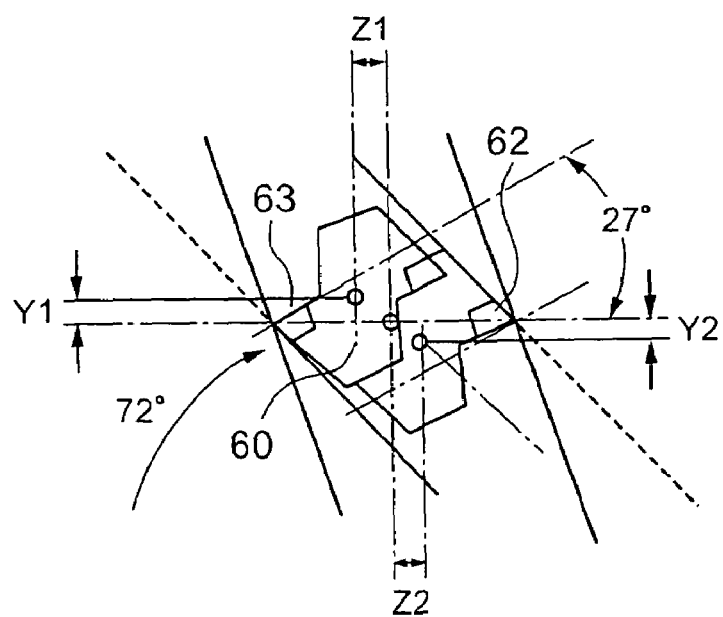

APPARATUS AND METHOD FOR PROCESSING SCREW ROTOR AND CUTTING BIT

TECHNICAL FIELD

The present invention relates to an apparatus and a method for processing a screw rotor that is used in a refrigerant compressor or air compressor, and to a cutting bit.

BACKGROUND ART

In known methods for processing screw rotors, a blank for screw cutting is provided in a first shaft and tools are set in a second shaft whose rotational axis is orthogonal to that of the first shaft. These first and second shafts are synchronously rotated by external means. At the beginning of processing grooves, the entire tools are compressed in the second shaft. When the process proceeds, the tools are progressively expanded out into a screw.

This is disclosed in PCT Japanese Translation Patent Publication No. Hei 6-506640 (FIGS. 2, 3, 4, 5, 6, 7, 14 and the like), for example.

In the known processing methods, accuracy of finishing is compromised due to various factors such as groove size and installation position of tools, distance between the rotational axis of the first shaft and that of the second shaft, or accuracy of the processing apparatus. Specifically, in a process using a forming tool, the cutting resistance at the groove bottom is very large and thus micro-cutting, that is, 0.04 mm in one cut at most is required. Furthermore, the entire cut length becomes long, which exerts adverse effects on the improvement in the processing time and service life of the tool.

Furthermore, with the known methods for processing screw rotors, if production of the particular processing apparatus intended for processing the screw rotor is discontinued, the screw rotor cannot be manufactured.

Moreover, since grooves on the screw rotor have complex shapes, a special measuring device is necessary to measure the grooves. Therefore, in the known processing methods, a measuring step is provided as an additional step. Accordingly, a workpiece is detached from the processing apparatus during the process and is measured to determine whether the groove has predetermined dimensions. After the measurement, the workpiece is returned to the process.

To solve the above described problems, it is a first object of the present invention to provide a method and an apparatus for processing a screw rotor in which a groove with a complex shape and the inner and outer surfaces of the screw rotor are efficiently processed with high accuracy using a commercially-available five-axis NC machine tool and to provide a cutting bit for use in the processing apparatus and method.

A second object of the present invention is to provide a method and an apparatus for processing a groove with a cutting depth that enables high processing efficiency, for the purpose of solving the problem of having a small cutting amount in the process using the forming blade due to cutting resistance at the groove bottom.

A third object of the present invention is to provide a method and an apparatus for processing a screw rotor in which the accuracy of the shape of a groove, which is determined depending on the processing apparatus, arrangement, and tool in the known processing method and apparatus, can be readily modified.

A fourth object of the present invention is to provide a method and an apparatus for processing a screw rotor in which the accuracy of the shape of a groove processed by the apparatus can be measured and modified, which is not possible with known processing apparatuses.

A fifth object of the present invention is to provide a method and an apparatus for processing a screw rotor in which both an inexpensive commercially-available tool and an expensive special tool are used in combination to process the screw rotor so that the expensive special tool can have a long service life and the overall expenses of the tools can be reduced.

A sixth object of the present invention is to provide a method and an apparatus for processing a screw rotor in which the screw rotor is processed without a shaft, which is provided in the screw rotor in the known methods, and thus costs of processing and facilities are reduced.

DISCLOSURE OF INVENTION

An apparatus for processing a screw rotor according to the present invention includes a bed; a C-axis shaft supporter disposed on the bed; a C-axis shaft held by the C-axis shaft supporter, for rotating a cylindrical object; a column disposed on the bed; a rotatable blade holder held by the column; and a tool attached to the blade holder, wherein the apparatus further includes a special shaft and a workpiece-attaching member, the special shaft being connected to the C-axis shaft and rotating in synchronism with the C-axis shaft, the workpiece-attaching member being connected to the special shaft and rotating in synchronism with the special shaft.

A method for processing a screw rotor according to the present invention includes a step of rotating a blade holder while shifting the blade holder in X-axis, Y-axis, and Z-axis directions to form a groove on the outer surface of a rotating workpiece using the aforementioned tool. This method includes a first step of roughly cutting the groove on the outer surface of the workpiece and a second step of shaving the side surfaces and the bottom surface of the groove.

According to the present invention, complex grooves are effectively processed with high accuracy under five-axis NC control. Furthermore, with the method according to the present invention, grooves are processed to have special shapes on their groove bottoms and various special tooth shapes for a single screw can be manufactured.

BRIEF DESCRIPTION OF THE DRAWINGS

FIG. 21 shows a front view, a side view, and an enlarged view of the blade of the bit shown in FIG. 20.

FIG. 22 is a schematic view showing a relationship between the groove and the groove-side-shaving bit according to the second embodiment.

BEST MODE FOR CARRYING OUT THE INVENTION

First Embodiment

Figure 1:
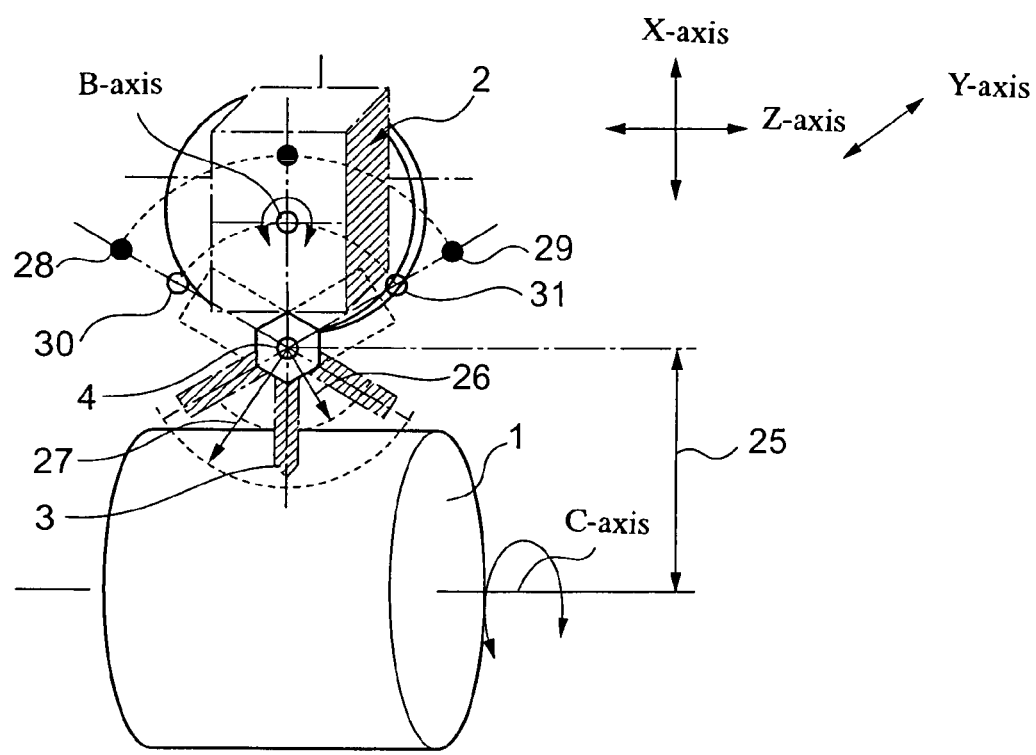
FIG. 1 is a schematic view showing the principal of a process for manufacturing a screw rotor.

The principle of a process for manufacturing a screw rotor according to the present invention will now be described by referring to FIG. 1.

A workpiece 1 as a cylindrical blank for screw cutting rotates around an axis (C-axis) that is a line connecting the center of the top surface (first flat surface) with the center of the bottom surface (second flat surface). A blade holder 2 is disposed at the position orthogonal to the C-axis, namely, above the circumferential surface (outer surface) of the workpiece 1. A tool 3 directing its blade towards the workpiece 1 is disposed at the bottom of the blade holder 2. The blade holder 2 pivots about a B-axis and moves in a Z-axis direction parallel to the C-axis, in an X-axis direction that is a vertical direction, and in a Y-axis direction that is orthogonal to both the Z-axis and the X-axis. In accordance with an NC program, the pivotal movement of the blade holder 2 about the B-axis and the movement of the blade holder 2 along the X-axis and Z-axis are combined in association with a predetermined rotation speed of the workpiece 1 around the C-axis. Accordingly, the tool 3 is rotationally moved about a reference point 4 to form a groove on the outer surface of the workpiece 1. The ratio of the circular movement of the tool 3 and the rotational movement of the workpiece 1 about the C-axis is 6:11, and these movements are synchronized. The tool 3 is protracted stepwise during the movement of the tool 3. Therefore, a radial length 26 of the tool 3 at the beginning of the process is changed to a radial length 27 at the completion of the process.

The principal of general compression by a screw compressor will now be described with reference to FIG. 2.

The screw compressor includes a screw rotor 1 with six grooves 9 and gate rotors 8a and 8b each having eleven teeth 10 to engage the grooves 9. The gate rotors 8a and 8b are symmetrically provided on the right and left sides of the screw rotor 1 in the direction orthogonal to the axis of the screw rotor 1. When the screw rotor 1 rotates, a groove of the screw rotor 1 expands and a refrigerant gas is sucked into the groove. When the screw rotor 1 keeps rotating to reach the maximum volumes of the groove, the groove is trapped by the gate rotors 8a and 8b. Thereafter, when rotational movement of the screw rotor 1 further proceeds, the volumes of the groove is reduced to compress the refrigerant gas.

Figure 2:
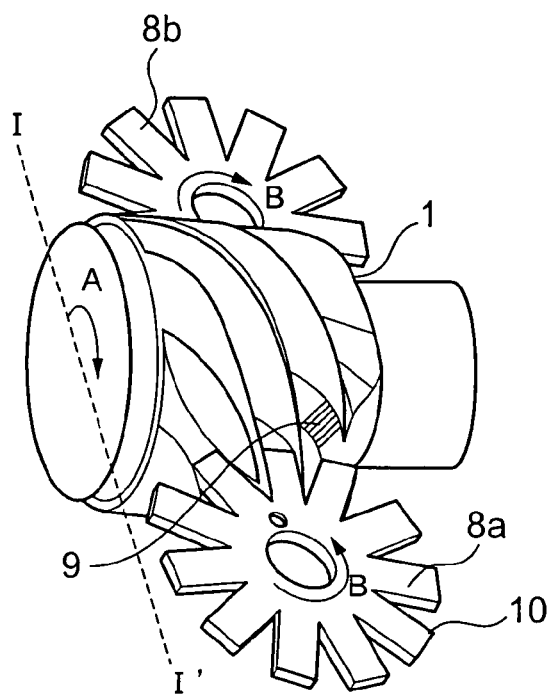
FIG. 2 is a schematic view showing the principal of compression by a screw compressor.
Figure 3:
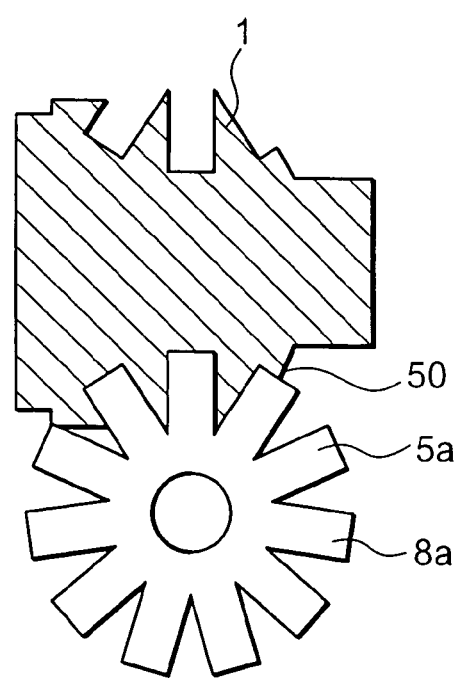
FIG. 3 is a partial cross-sectional view taken along line I–I' in FIG. 2.

FIG. 3 is a fragmentary cross-sectional view taken along line I–I' in FIG. 2, showing a state when the gate rotor 8a is engaged with the screw rotor 1.

A processing apparatus to realize the above-described principal of the process will now be described by referring to a schematic view of the structure of the apparatus in FIG. 4. FIG. 4(a) is a front view of the processing apparatus, and FIG. 4(b) is a longitudinal cross-sectional view taken along line II–II' in FIG. 4(a).

Figure 4:
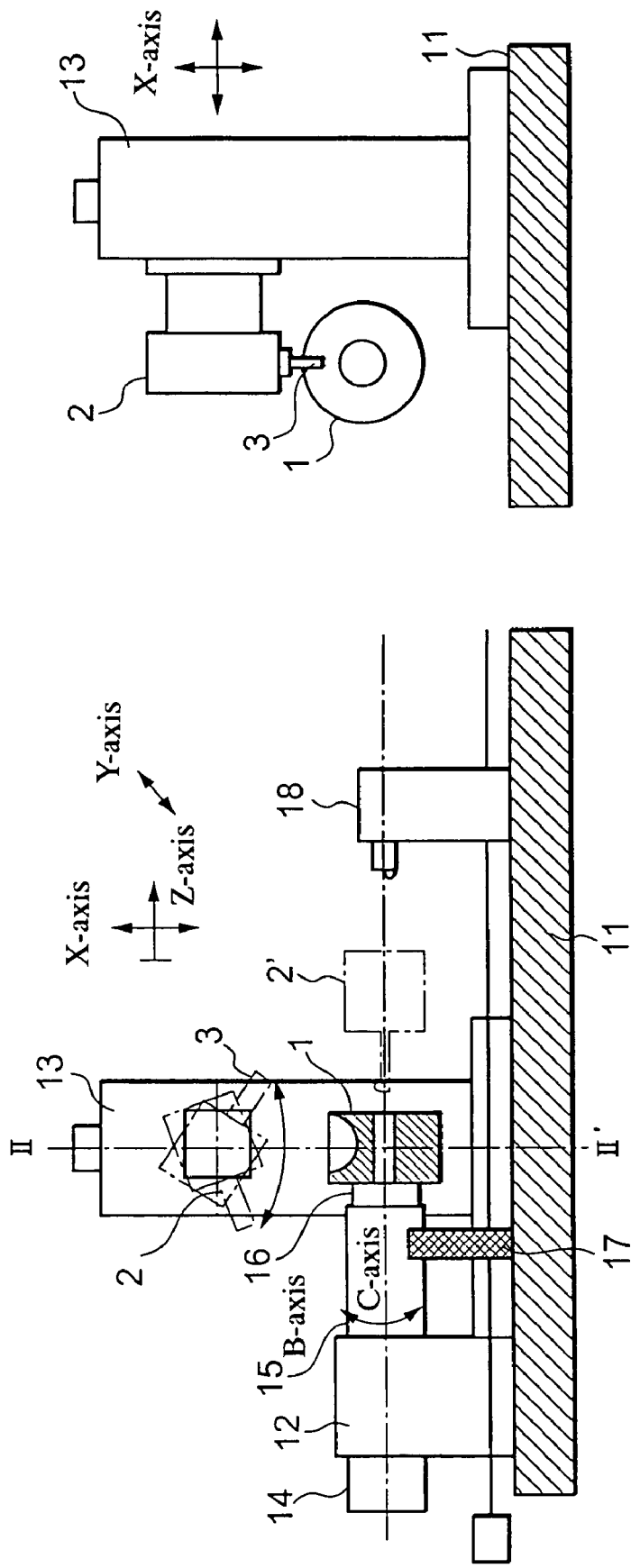
FIG. 4(A) is a structural front view of an apparatus for processing a screw rotor and FIG. 4(B) is a cross-sectional view of the apparatus.

Referring to FIG. 4, the processing apparatus includes a bed 11, a C-axis shaft supporter 12 disposed on the bed 11, a column 13, a C-axis shaft 14 rotatably supported by the C-axis shaft supporter 12, a blade holder 2 pivotably disposed on the side face of the column 13 close to the C-axis shaft supporter, and the tool 3 attached to the bottom of the blade holder 2. Regular five-axis NC machine tools also have the aforementioned structure.

In the processing apparatus, a special shaft 15 is provided at the end of the C-axis shaft 14 and thus the length of the shaft rotating about the C-axis is increased. An arbor 16 is disposed at the end of the special shaft 15 and the workpiece 1 is attached to the arbor 16. Since the special shaft 15 protrudes long from the C-axis shaft supporter 12, the special shaft 15 cannot provide sufficient accuracy due to its sensitivity to vibration. Therefore, preferably, the special shaft 15 is supported by a shake stopper 17.

A movable tail stock 18 is provided on the bed 11 and can be moved laterally. When the outer surface of the workpiece 1 is processed, the movable tail stock 18 supports the flat surface of the workpiece 1 remote from the special shaft 15 and turns in association with the movement of the C-axis shaft 14. When the inner surface of the workpiece 11 is processed, the column 13 is tilted to move the blade holder 2 to a position 2'. In this case, the movable tail stock 18 is moved to the end of the bed 11 to avoid interference with the column 13.

Figure 5:
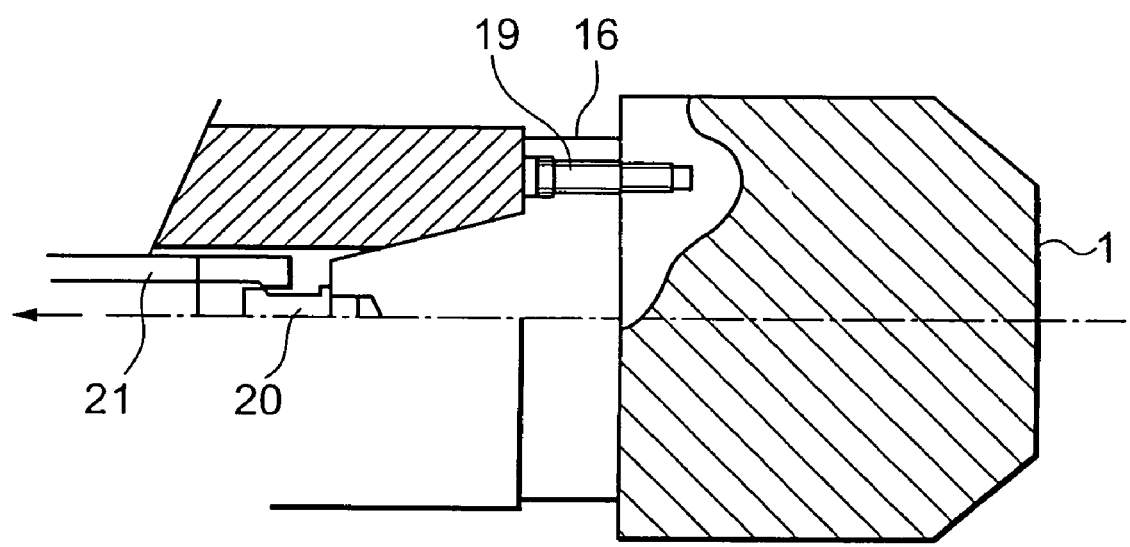
FIG. 5 is a schematic view showing a state when a workpiece is attached to an arbor.

FIG. 5 is a schematic view showing the state where the workpiece 1 is attached to the arbor 16. The arbor 16 is provided with a plurality of bolts 19. By inserting these bolts 19 into the workpiece 1, the workpiece 1 is fixed to the arbor 16. The side of the arbor 16 opposite from the side from which the bolts 19 protrude (the side close to the special shaft 15) is tapered. A pull stud bolt 20 disposed on the tapered end of the arbor 16 is inserted into a hole of the special shaft 15 and is strongly pulled by a pulling device 21, whereby the arbor 16 is securely fixed in the hole of the special shaft 15. At this time, centering is also performed.

Figure 6:
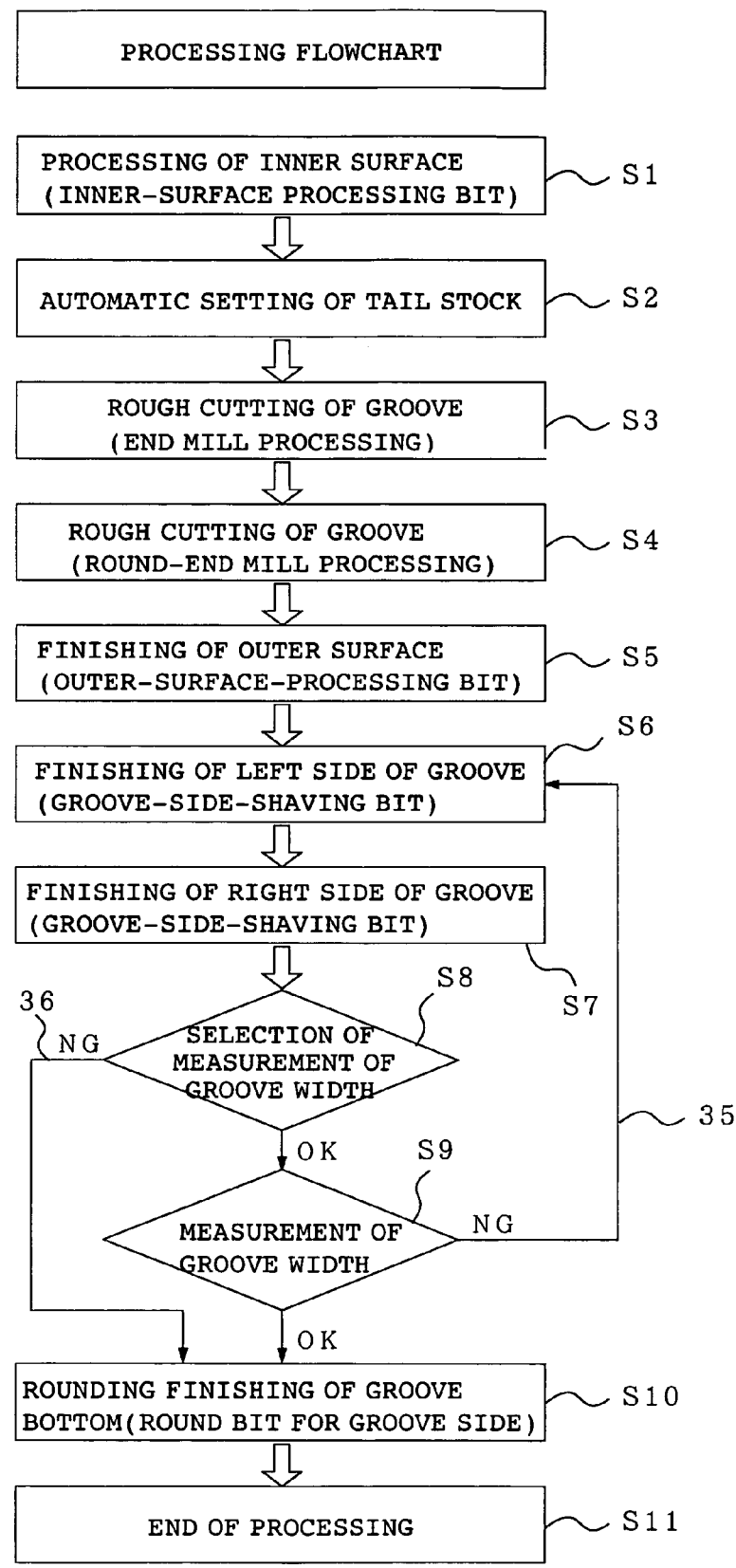
FIG. 6 is a flowchart of steps for processing a screw rotor.

Next, steps of processing a screw rotor using the aforementioned processing apparatus will be described by referring to the flowchart shown in FIG. 6. A series of steps is performed in accordance with the NC program previously input.

First of all, the inner surface of the workpiece 1 is processed (step 1). Step is referred to as "S" hereinbelow. An inner-surface-processing bit is used to process the inner surface of the workpiece 1. In this step, the blade holder 2 is moved to the position 2' in FIG. 4(a) and thus the movable tail stock 18 is disposed at the end of the bed 11.

When processing of the inner surface is completed, the movable tail stock 18 is moved along the bed 11 to support the workpiece 1 (S2).

Figure 7:
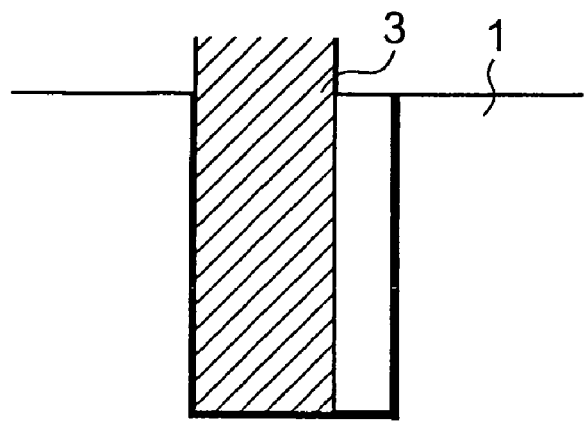
FIG. 7 is a conceptual view showing processing of the workpiece with an end mill.

Next, rough cutting of a groove is performed on the outer surface of the workpiece 1 (S3). In this step, since a groove is processed on the bare outer surface with an end mill, an automatic tool changer replaces the inner-surface-processing bit used in S1 with the end mill. FIG. 7 is a conceptual illustration, showing a state where the end mill processes the workpiece 1.

When a wide groove is processed or a groove needs to be processed with high precision, an end mill may be reciprocated at a small diameter.

Figure 8:
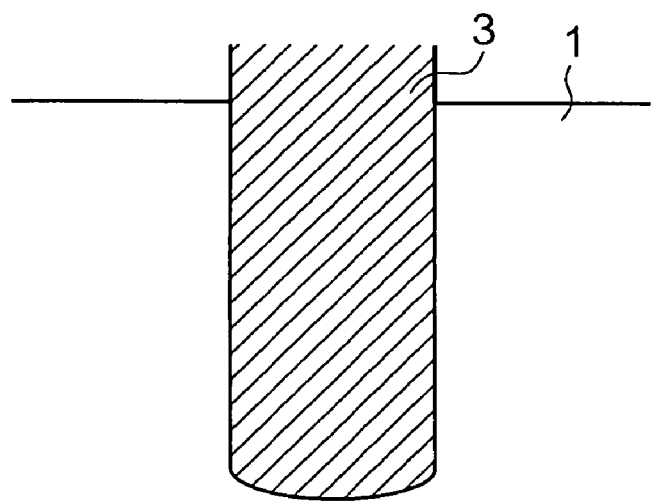
FIG. 8 is a conceptual view showing processing of the workpiece with a round-end mill.

Next, rough cutting is performed to form a round bottom of the rough groove on the outer surface of the workpiece 1 (S4). In this step, the end mill used in S3 is automatically changed to a round-end mill (the tip of the end mill is rounded). FIG. 8 is a conceptual illustration showing a state where the workpiece 1 is processed by the round-end mill.

Next, finishing of the outer surface of the workpiece 1, that is, shaving on the bare areas of the column where no groove is provided is performed (S5). In this step, the round-end mill used for S4 is automatically switched to an outer-surface-processing bit.

Next, finishing of the left side of the groove (S6) and finishing of the right side of the groove (S7) are performed. In these steps, the outer-surface-processing bit used for S5 is automatically switched to a groove-side-shaving bit.

Figure 9:
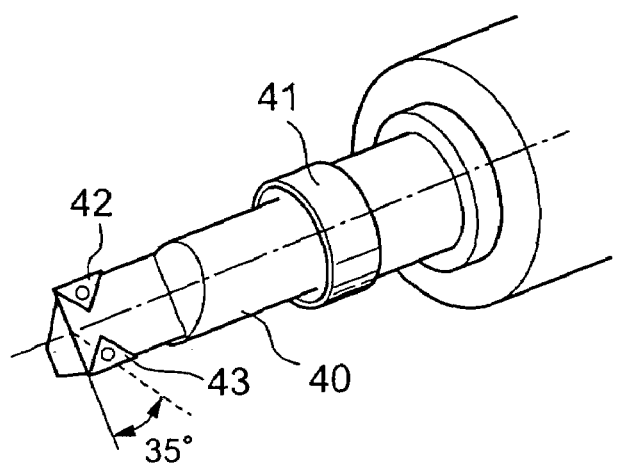
FIG. 9 is a perspective view of a groove-side-shaving bit used in a first embodiment.
Figure 10:
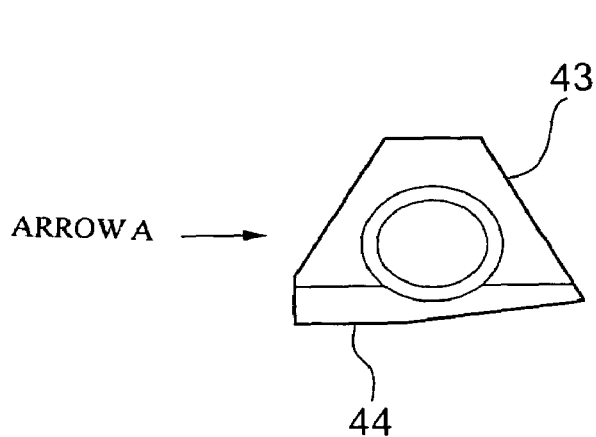
FIG. 10(A) is a front view of a blade of a bit and FIG. 10(B) is an enlarged view of a blade edge.
Figure 10:
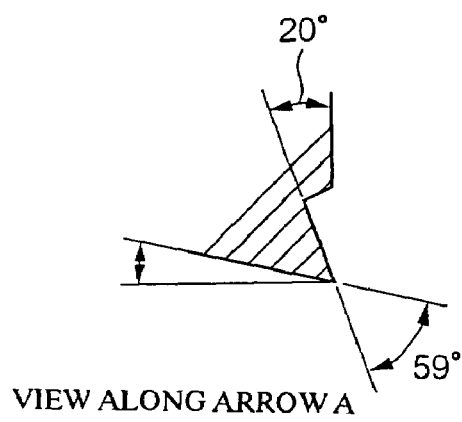

FIG. 9 is a perspective view of a groove-side-shaving bit 40. This tool is used for a shaving process performed at a cutting feed rate with the shaft fixed (irregularities on the surface are shaved off). Therefore, the groove-side-shaving bit 40 is placed by shifting the phase by 27° with respect to the orientation of the shaft and is attached to a commercially-available tool holder 41 for use. The groove-side-shaving bit 40 has a right blade 42 and a left blade 43. FIG. 10 shows the portion of the blade. Commercially-available throw-away chips are used for the blades. Since these blades each have a rake angle of 20° and a 4-mm-long parallel blade 44, the cut angle and cut depth are improved.

Figure 11:
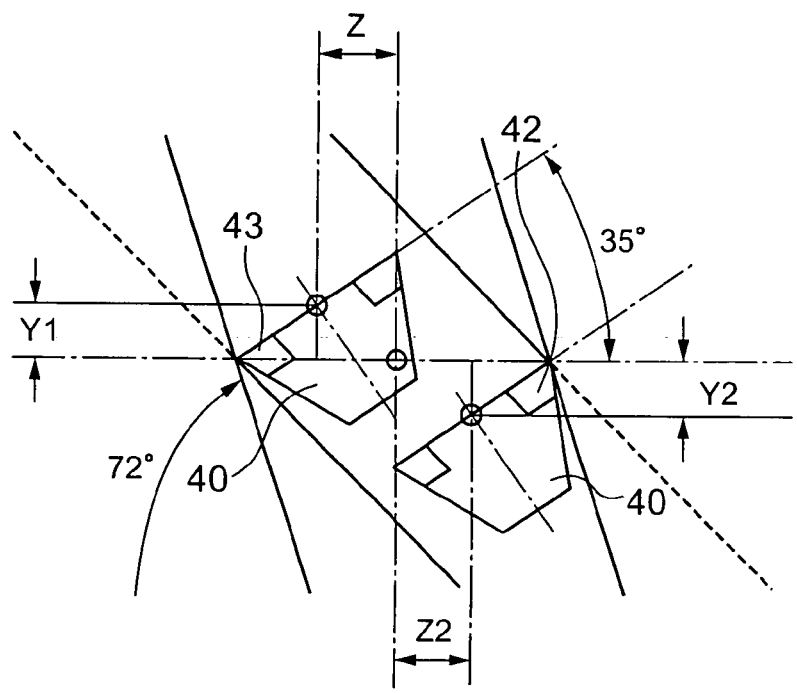
FIG. 11 is a schematic view showing a relationship between a groove and the groove-side-shaving bit.

FIG. 11 shows a relationship between the groove and the right blade 42 and the left blade 43 in the groove-side-shaving bits 40, in a right side finishing process and a left side finishing process.

Figure 12:
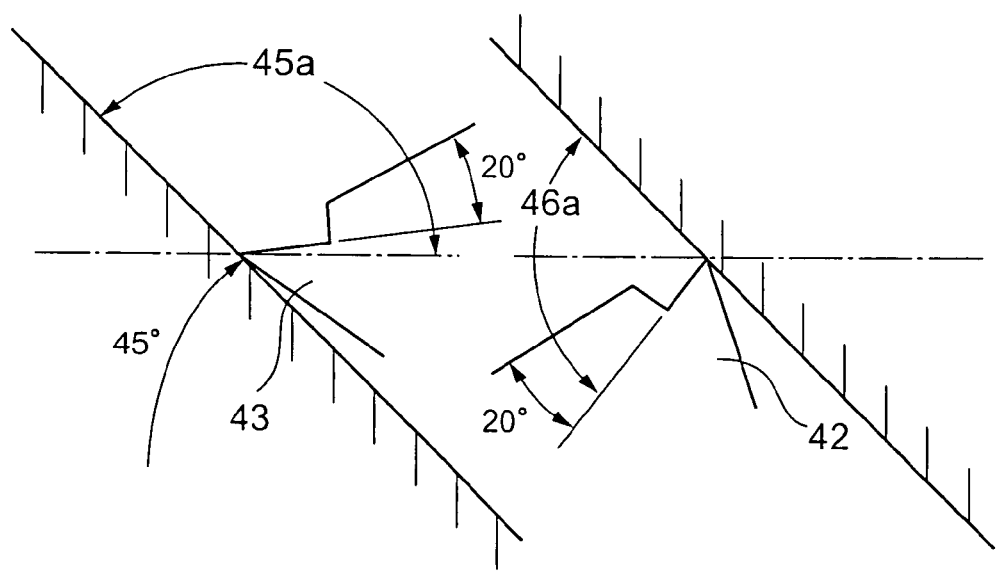
FIG. 12 is a schematic view showing a relationship between the groove and right and left cut angles.
Figure 13:
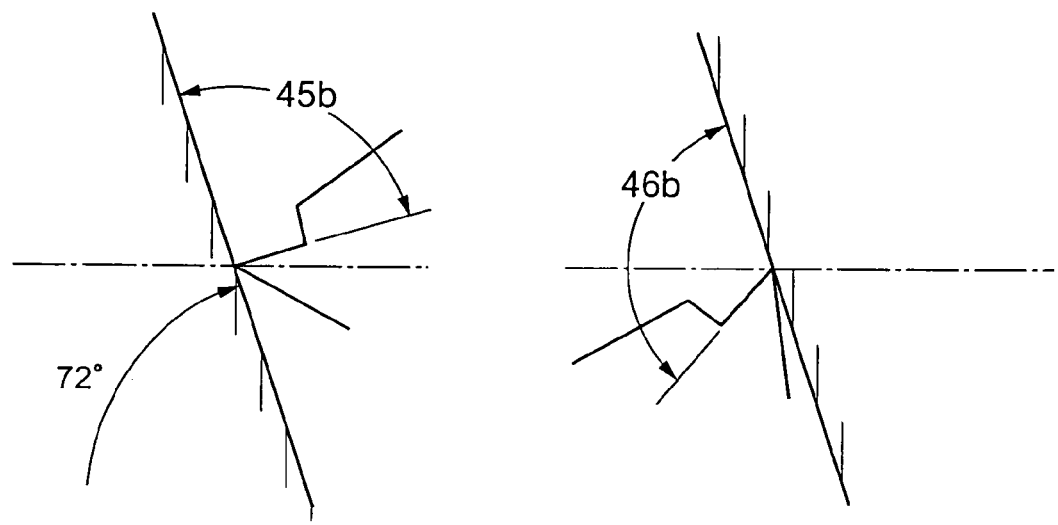
FIG. 13 is a schematic view showing a relationship between the groove and right and left cut angles.

In the processes, the blade edges have to recede by 1 mm from the rotational axis of the workpiece. Therefore, the Y-axis and the Z-axis of the processing apparatus are aligned to Y1 and Z1 when processing the left side and to Y2 and Z2 when processing the right side. Since the blades each have a structure shown in FIG. 10, left cut angles 45a and 45b are in the range of 120° to 93°, whereas right cut angles 46a and 46b are in the range of 93° to 120°, as shown in FIGS. 12 and 13. In this way, the right and left blades can be operated under the same cutting conditions.

Figure 15:
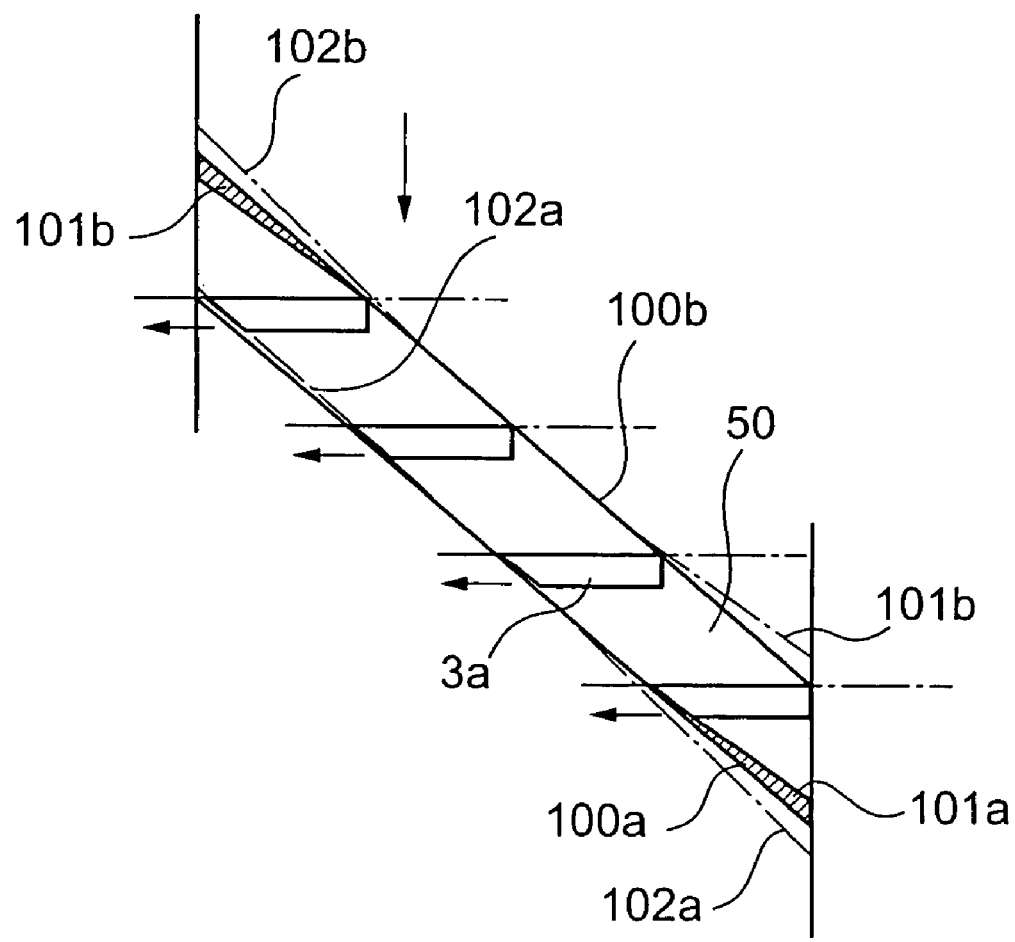
FIG. 15 shows profile lines of the side surfaces of a groove formed with a rotational circle.

FIG. 15 shows profile lines of the side surfaces of a groove formed with a given clearance circle. In FIG. 15, lines 100a and 100b are theoretical lines calculated at a theoretical synchronous ratio, and the lines 101a and 101b are profile lines having errors processed by a known method. The lines 101a and 101b cannot be processed with the known method but can be processed with the aforementioned groove-side-shaving bit for the right and left side surfaces.

Figure 19:
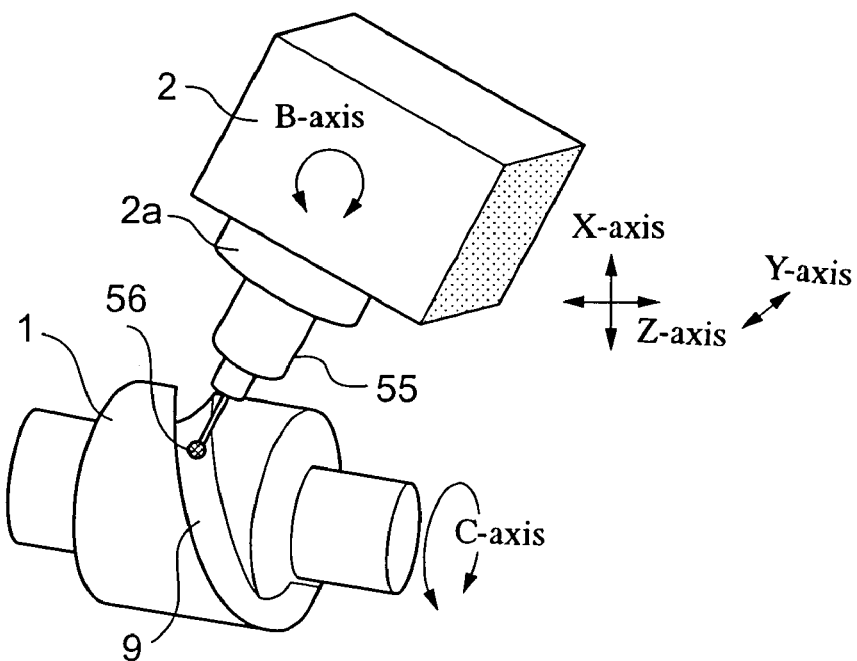
FIG. 19 is a schematic view showing an automatic measurement of the width of a groove.

Next, measurement of the groove width is performed (S8). The processing apparatus includes an automatic measuring system for arbitrary measurement of the object at the beginning of a process, or for periodical measurement during the process. When the measurement of the groove width is selected, the groove width is measured (S9). FIG. 19 shows a state of measuring the groove width. The measurement is performed by a contact-measuring device 55, which is typically used in tool machines. The measuring device 55 is automatically attached to a shaft 2a of the blade holder 2 pivotal about the B-axis. The measuring device 55 measures the groove width of the processed portion under the same movement control as that of the processing principal (X-, Z-, B-, C-, B-axis movement control). The measurement is automatically performed by an automatic measuring program for the groove width. The measuring program instructs the measuring device 55 to measure the width, the depth, and the index angle of the groove. By this instruction, a tip probe 56 of the measurement device is inserted into the groove 9 to come into contact with the groove 9 in the workpiece 1, thereby obtaining positional information. This positional information is then processed to obtain the measurement result. The accuracy of the process is evaluated based on the data of the groove width. When the evaluation exceeds the predetermined range, the process returns to S6 as indicated by an arrow 35 to input a corrected value, and then S6, S7, S8, and S9 are performed again in this order. When the evaluation falls within the range, the process proceeds to S10. If the process is stable, S9 may be omitted (arrow 36).

Next, rounding finishing of the groove bottom is performed (S10). In this step, the touch-probe measuring device 55 used for S9 or the groove-side-shaving bit 40 used for S7 is replaced by a groove-bottom round-bit 110. In this step, the groove bottom is rounded by shaving.

When the grooves of the screw rotor 1 shown in FIG. 3 are engaged with the gate rotor 8a, thermal deformation occurs due to the difference in temperature between the entrance and exit of the refrigerant gas. Since the gate rotor 8a is made of plastic, the outer surface of the screw rotor 1 comes into contact with the gate rotor due to the thermal expansion and is shaved off, and thus the gap between the outer surface of the screw rotor 1 and the gate rotor is increased. This is one factor for degraded performance.

Figure 14:
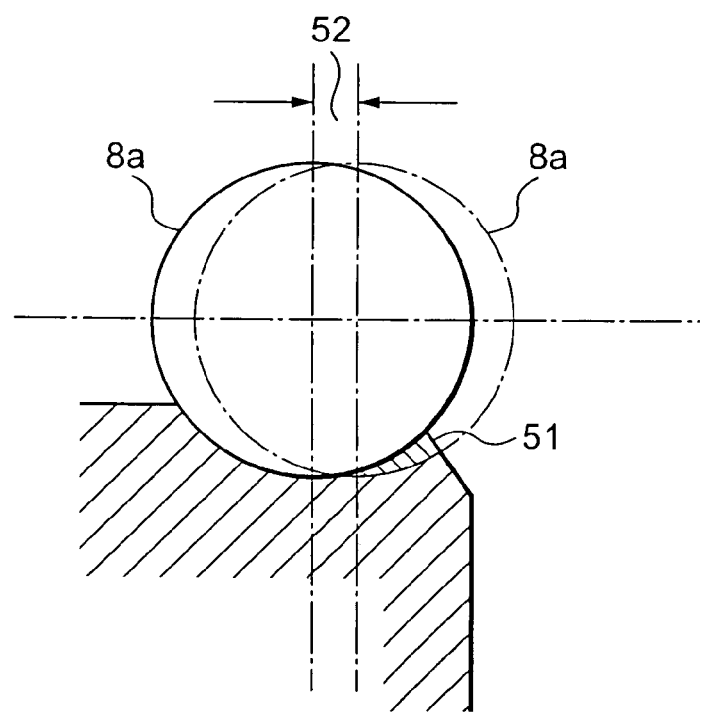
FIG. 14 is a schematic view showing a clearance portion.

In this process, preferably a clearance portion is formed in a groove edge 50 shown in FIG. 3. As shown in FIG. 14, provision of a clearance portion 51 makes the gate rotor 8a capable of being shifted optionally by a distance 52 in the direction indicated by the arrows. In this way, the outer surface of the screw rotor 1 is not shaved, thereby realizing almost ideal engagement of the outer surface of the screw rotor 1 and the gate rotor. This process can be sequentially performed by inputting the radius and the coordinates of the rotational axis in the NC program.

Figure 16:
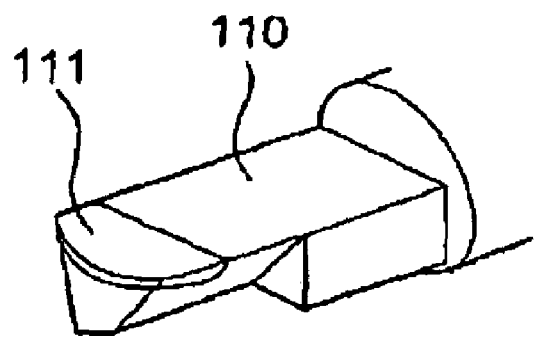
FIG. 16(A) is a schematic view of a known bit and FIG. 16(B) is a schematic view of a groove-bottom-round-bit of the present invention.
Figure 16:
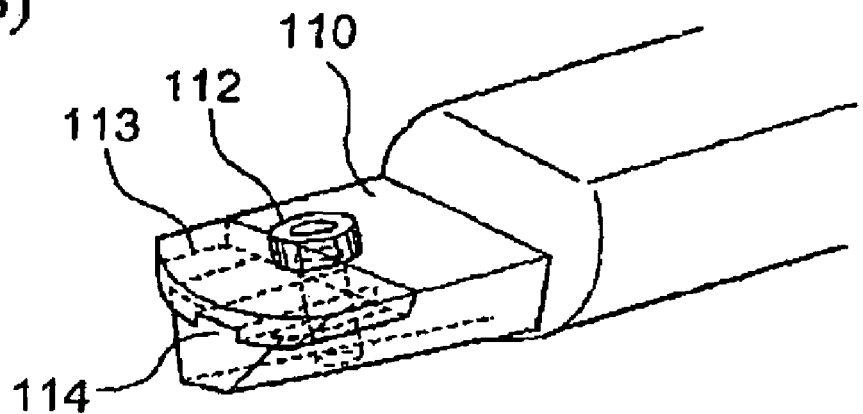
Figure 17:
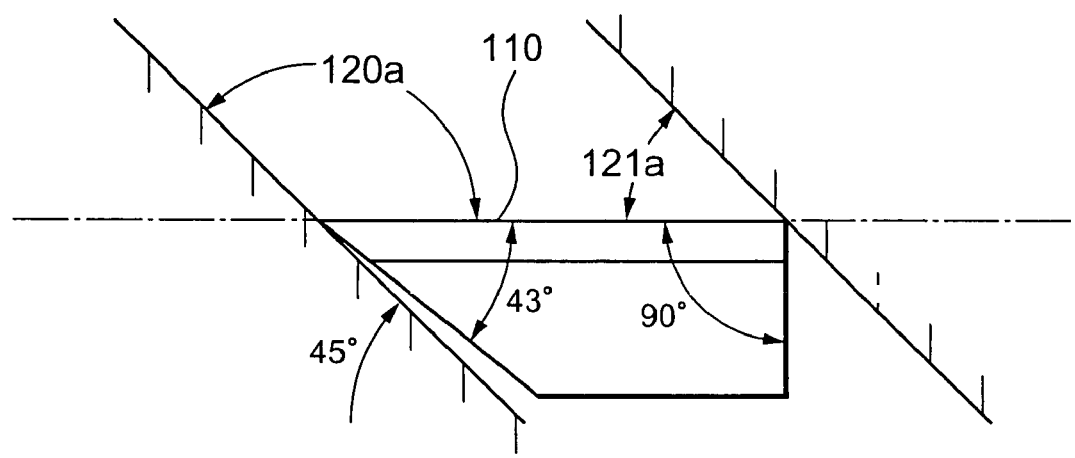
FIG. 17 is a schematic view showing a relationship between the groove and the bit.
Figure 18:
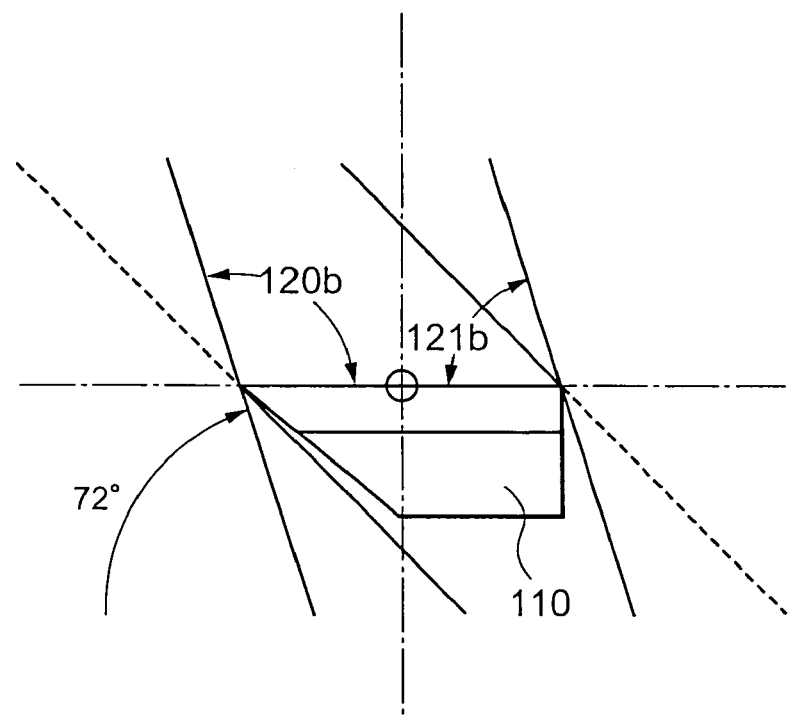
FIG. 18 is a schematic view showing a relationship between the groove and the bit.

Even though the bit 110 of a known type shown in FIG. 16 is used in S6 and S7, the amount of cut can dramatically be increased from 0.04 mm to 0.5–2 mm. However, due to the change in contact angle inherent in a single screw rotor (45° to 72°) and the difference in cut angle between the right and left blades, desired surface roughness cannot be accomplished by the known bit. More specifically, as shown in FIGS. 17 and 18, left cut angles 120a and 120b are in the range of 135° to 108°, whereas the right cut angles 121a and 121b are in the range of 43.5° to 72°. Accordingly, the right blade may chafe the outer surface during the cutting process. Furthermore, since the clearance angle of the left blade is made large so as to prevent the left blade from contacting with the workpiece, the angle of the left blade edge is 43° at most, resulting in decreased strength. Therefore, the left blade has a disadvantage in that it cannot tolerate a high feed rate. By contrast, according to the present embodiment, the above-described disadvantages are overcome by the use of the tool shown in FIG. 9 in S6 and S7. Furthermore, in S6 and S7, since a tool used for the narrow groove width can also process a wide groove, only a single tool is necessary, resulting in reduced costs as compared to using an expensive forming tool bit.

When the groove width is modified with a known special-purpose processing apparatus, the width of the forming tool bit needs to be controlled. Further, the dimensional accuracy of the groove varies due to the accuracy of the processing apparatus and deterioration in accuracy of the processing apparatus over time, whereby it is difficult to control the dimensional accuracy of the groove. Furthermore, backlash of the processing apparatus in accordance with the processing principle causes the blade to slip and thus the desired shape cannot be formed. By contrast, according to the present invention, the rough processing is performed at first and then the side surfaces of the grooves are finished with the blades having different angles, whereby slipping of the blades hardly ever occurs. Furthermore, the groove width can be modified by the use of the NC processing program.

Furthermore, the groove bottom is roughly processed with a groove-bottom round-end mill shown in FIG. 8 and is then finished with the groove-bottom round-bit of a known type shown in FIG. 16(A), whereby the amount of the groove-bottom shaved in finishing is 0.2 mm or less. Accordingly, the process is performed with the minimum number of cutting steps, thereby contributing to decreased processing time.

Since a process of rounding the groove bottom has large cutting resistance, the tool has to have high strength. A blade edge 111 of the bit shown in FIG. 16(A) is brazed and thus has a decreased strength due to the influence of heat. By contrast, when a throw-away-chip-type blade edge 113 that can be clamped with a bolt 112, as shown in FIG. 16(B), is employed, the bit has increased strength, thereby improving the cutting efficiency. In this case, the chip is positioned by a slit 114.

A single groove is formed in a series of processes from S1 to S10 and also the other grooves are sequentially processed using the tools described above. If a series of steps shown in FIG. 6 is programmed as a reference processing program and required processes and tools are called up optionally to process the other five grooves, the program can be shortened.

The standard process of a screw rotor has a design of 6 parallel grooves of the screw for 11 teeth of the gate rotor and this design is fixed in a known special-purpose apparatus. However, according to the above-described processing apparatus and process, a specific groove and tooth arrangement, such as 5 grooves of the screw for 7 teeth of the gate rotor can be realized. The processing apparatus of a known type is specially built for a particular process and thus is only used for one type of tooth shape. On the other hand, the process of the present invention can deal with various types of tooth shape and thus there is possibility of new tooth designs.

Second Embodiment

Figure 20:
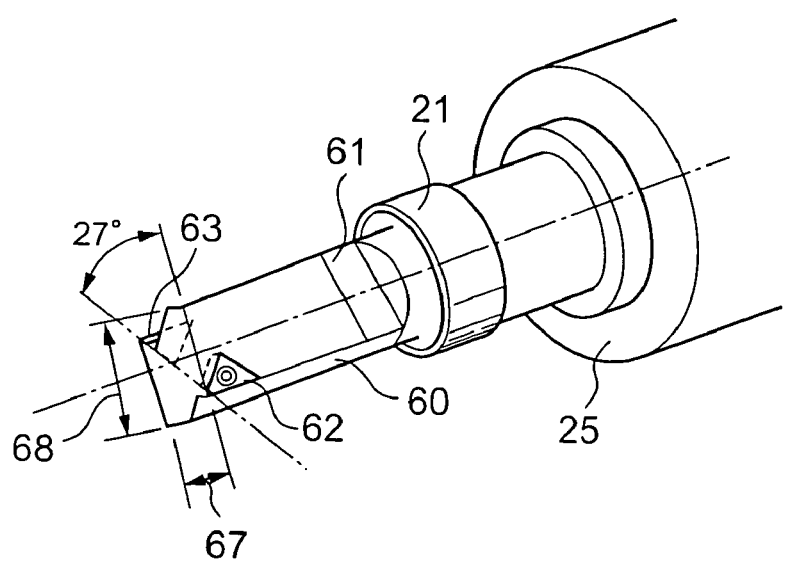
FIG. 20 is a schematic view of a groove-side-shaving bit used in a second embodiment.

In the first embodiment, priorities are given to the accuracy of the processing apparatus and processing, and thus the process in a single direction with the groove-side-shaving bit shown in FIG. 9 is described. If a processing apparatus can exhibit the same accuracy in a reciprocating process as that in the single-direction process, the reciprocating process can utilize the time for the tool to return, thereby further reducing the processing time. FIG. 20 shows a groove-side-shaving bit that realizes this reciprocating process.

FIG. 20 is a perspective view of a reciprocation-type-groove-side-shaving bit 60 inserted into a shaft 25 of the B-axis blade holder. This tool is used for shaving at a cutting feed rate with the shaft 25 fixed. Therefore, a standard-for-oblique-view 61 is provided in order to shift the phase of the tool by 27° with respect to the orientation of the shaft. This tool can be attached to a commercially available tool holder 41 for use.

The reciprocation-type-groove-side-shaving bit 60 is provided with symmetrical throw-away-chips 62 and 63 shown in FIG. 21. Each of the chips 62 and 63 is composed of a commercially-available throw-away-chip, and a flank 64 has a rake angle of 20°, which is the most distinctive feature of this embodiment. A parallel blade 65 measures 4 mm in length. The rake angle is provided at the rake surface 66 in the first embodiment but is provided on the flank 64 according to the present invention and thus the chip is symmetrical. Therefore, the tool has large thicknesses 67 and 68, thereby increasing the strength of the tool. Furthermore, with this structure, deformation in the tool is eliminated and thus increased cut-depth and a high-speed cutting feed rate are accomplished.

FIG. 22 shows a relationship between the groove and a right blade 62 and a left blade 63 in the reciprocation-type-groove-side-shaving bit 60 in the finishing process of the right and left side surfaces.

Figure 23:
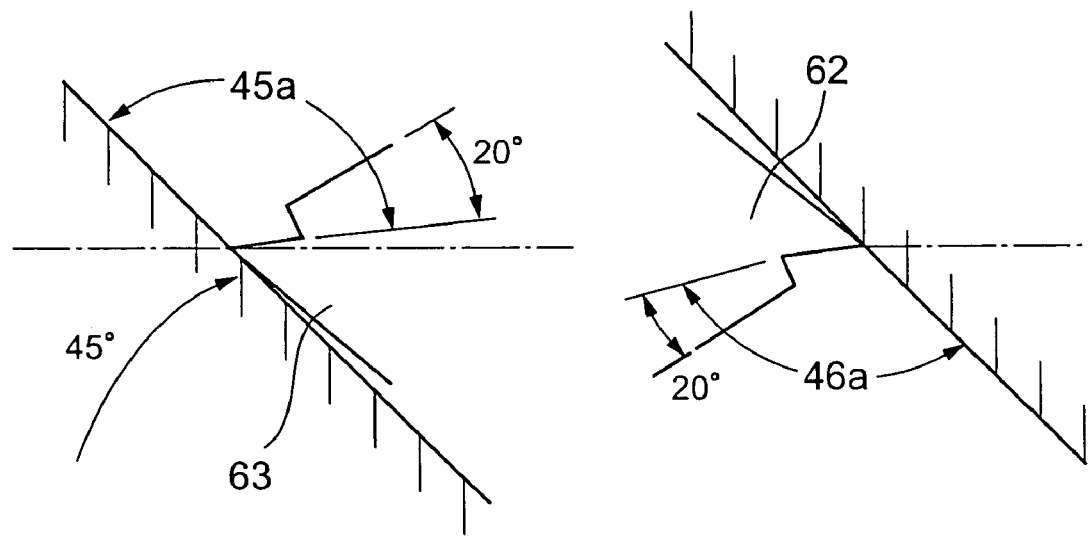
FIG. 23 is a schematic view showing a relationship between the groove and right and left cut angles according to the second embodiment.
Figure 24:
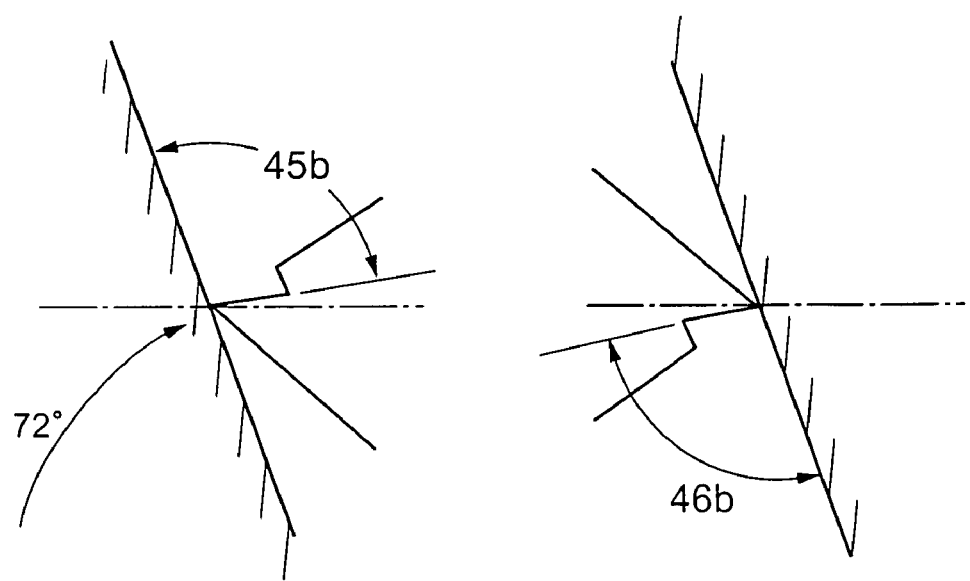
FIG. 24 is a schematic view of a relationship between the groove and right and left cut angles according to the second embodiment.

In this process, the blade edges need to be recessed by 1 mm from the rotational axis of the work. This is accomplished by aligning the Y-axis and the Z-axis of the processing apparatus to Y1 and Z1 in processing the left side and to Y2 and Z2 in processing the right side. Since the blades have the structures shown in FIGS. 23 and 24, left cutting angles 45a and 45b are in the range of 120° to 93°, whereas right cutting angles 46a and 46b are in the range of 93° to 120°. Therefore, the right and left blades of the present embodiment can perform reciprocating cutting under the same blade edge conditions, similar to the first embodiment.

To confirm the effects of the process with the reciprocating-groove-side-shaving bit, experimental processes according to a known method and the first and second embodiments are performed. In these experiments, only the time for processing the side surfaces of the grooves is compared, not the entire processing time.

(Evaluation of a Process for Forming 6 Grooves Each Having a Length of 215 mm and a Depth of 40 mm, for Example)

Known method: cut depth, 0.04 mm; feed rate, 9000 mm; return rate, 9000 mm/min; the number of cuts, forward movement, 40/0.04=1000, backward movement 40/0.04=1000, total of 6-grooves, 12000;

reciprocating processing time, 215*2/9000*1000=47.7 min; total processing time for 6 grooves, 47.7 min*6-grooves=286 min First embodiment: cut depth, 2 mm; feed rate, 3000 mm/min; return rate, 9000 mm/min; the number of cuts, forward movement, 40/2=20, backward movement 40/2=20, total of 6-grooves, 240; one-way processing time for right and left sides, 215/3000*20*2=2.86 min; returning time, 215/9000*20*2=0.95 min; total processing time, 2.86+0.95=3.81 min; total processing time for 6 grooves, 22.9 min Second embodiment: cut depth, 3.5 mm; feed rate, 9000 mm/min; return rate, 9000 mm/min; the number of cuts, forward movement, 40/3.5=12, backward movement, 40/3.5=12, total of 6 grooves, 144; reciprocating processing time for right and left sides, 215*2/9000*12*2=1.14; total processing time for 6-grooves, 6.9 min These results confirm that the number of positioning and the loss time are improved drastically, thereby improving the processing efficiency in the second embodiment. The number of the reciprocating movements at a high moving rate is halved, resulting in long service life of the sliding surface.

REFERENCE NUMERALS

1 workpiece (screw rotor), 2 blade holder, 3 tool, 8 gate rotor, 9 grooves, 10 teeth, 11 bed, 12 C-axis shaft supporter, 13 column, 14 C-axis shaft, 15 special shaft, 16 arbor, 17 shake stopper, 18 movable tail stock, 19 bolts, 20 pull stud bolt, 21 pulling device, 40 groove-side-shaving bit, 41 commercially available tool holder, 42 right blade, 43 left blade, 44 parallel blade, 45 cut angle, 51 clearance portion, 55 contact measuring device, 60 reciprocation-type-groove-side-shaving bit, 61 standard-for-oblique-view, 62 right blade, 63 left blade, 100 theoretical line, 101 line processed by a known method, 120 left cut angle, 121 right cut angle.

The invention claimed is:

1. A method for processing a screw rotor comprising a step of rotating a blade holder while shifting the blade holder in X-axis, Y-axis, and Z-axis directions to form a screw groove on the outer surface of a rotating cylindrical workpiece with a tool, using a processing apparatus comprising a bed; a C-axis shaft supporter disposed on the bed; a C-axis shaft held by the C-axis shaft supporter, for rotating the cylindrical workpiece; a column disposed on the bed; the blade holder rotatably held by the column; and the tool attached to the blade holder, in which said step to form a screw groove includes a first step of roughly cutting the groove on the other surface of the workpiece using a tool having an end mill and a round end mill, and a second step of shaving the left, right and bottom surfaces of the groove, wherein a shaving bit having two blades set at different angles is used for shaving the left surface and right surface, respectively, and a round bit is used for shaving the bottom surface.

2. The method according to claim 1, wherein shaving is performed in one direction in the second step.

3. The method according to claim 1, wherein shaving is performed in a reciprocating manner in the second step.

4. The method according to claim 1, wherein the method includes a measuring process to automatically measure the width of the processed groove during or at the completion of the process.

5. The method according to claim 1, wherein shaving the side surfaces comprises utilizing a shaving bit having replaceable blades that are disposed at right and left edges of the shaving bit, wherein the blades each have a rake angle of about 20° with respect to a surface adjacent to a flank.

6. The method according to claim 1, wherein shaving the side surfaces comprises utilizing a shaving bit having replaceable blades that are symmetrically disposed at right and left edges of the shaving bit, wherein the blades each have a rake angle of about 20° at a flank.

7. The method according to claim 1, wherein the sub-step of rounding the bottom of the groove comprises utilizing a round bit having a replaceable throw-away-chip blade fixed with a clamping bolt.

* * * * *